(12) United States Patent
Kaushik et al.

(10) Patent No.: US 7,493,438 B2
(45) Date of Patent: Feb. 17, 2009

(54) APPARATUS AND METHOD FOR ENUMERATION OF PROCESSORS DURING HOT-PLUG OF A COMPUTE NODE

(75) Inventors: Shivnandan D. Kaushik, Portland, OR (US); James B. Crossland, Banks, OR (US); Mohan J. Kumar, Aloha, OR (US); Linda J. Rankin, Portland, OR (US); David J. O'Shea, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 1166 days.

(21) Appl. No.: 09/971,211

(22) Filed: Oct. 3, 2001

(65) Prior Publication Data

US 2003/0065752 A1   Apr. 3, 2003

(51) Int. Cl.
*G06F 13/00* (2006.01)
(52) U.S. Cl. .......................... 710/302; 710/9
(58) Field of Classification Search ......... 710/300–304, 710/104, 8, 9; 713/1–2
See application file for complete search history.

(56) References Cited

U.S. PATENT DOCUMENTS

| | | | |
|---|---|---|---|
| 5,933,609 A | | 8/1999 | Walker et al. |
| 5,999,997 A * | | 12/1999 | Pipes .......................... 710/303 |
| 6,161,157 A * | | 12/2000 | Tripathi et al. .............. 710/109 |
| 6,212,585 B1 * | | 4/2001 | Chrabaszcz ................. 710/302 |
| 6,249,828 B1 * | | 6/2001 | Wallach et al. .............. 710/302 |
| 6,295,566 B1 | | 9/2001 | Stufflebeam |
| 6,338,150 B1 * | | 1/2002 | Johnson et al. ............... 714/39 |
| 6,516,367 B1 * | | 2/2003 | Barenys et al. .............. 710/109 |
| 6,754,725 B1 * | | 6/2004 | Wright et al. ................... 710/8 |
| 6,925,513 B1 * | | 8/2005 | Clark .......................... 710/104 |

FOREIGN PATENT DOCUMENTS

| | | |
|---|---|---|
| GB | 2354905 | 4/2001 |
| WO | WO 00/58846 | 5/2000 |

OTHER PUBLICATIONS

PCT Search Report mailed Aug. 11, 2003 in related pending PCT Applicaiton No. PCT/US02/31327.
"PICMG 2.14 R1.0 MultiComputing Short Form Specification", CompactPCI; PCI Industrial Computers Manufactures Group, Sep. 6, 2001, pp. 1-6.

* cited by examiner

*Primary Examiner*—Glenn A Auve
*Assistant Examiner*—Trisha Vu
(74) *Attorney, Agent, or Firm*—Blakely, Sokoloff, Taylor & Zafman LLP

(57) ABSTRACT

An apparatus and method for enumeration of processors during hot-plug of a compute node are described. The method includes the enumeration, in response to a hot-plug reset, of one or more processors. The enumeration is provided to a system architecture operating system in which a compute node is hot-plugged. Once enumeration is complete, the compute node is started in response to an operating system activation request. Accordingly, once device enumeration, as well as resource enumeration are complete, the one or more processors of the processor memory node are activated, such that the operating system may begin utilizing the processors of the hot-plugged compute node.

29 Claims, 15 Drawing Sheets

APPARATUS AND METHOD FOR ENUMERATION OF PROCESSORS DURING HOT-PLUG OF A COMPUTE NODE

FIELD OF THE INVENTION

The invention relates generally to the field of device hot-plugs. More particularly, the invention relates to a method and apparatus for enumeration of processors during hot-plug of a compute node.

BACKGROUND OF THE INVENTION

The development of server chipsets and server products that are targeted at high end enterprise class server systems requires careful consideration of reliability, availability and serviceability (RAS) requirements as well as features. Such products may be intended for use as back-end servers (such as in a data center), where RAS features and requirements are as important as system performance. The ability to swap out modules in a computer system without powering down or shutting down a computer is beneficial. This "swapping" is referred to by various names, such as: hot socket, hot swap, hot addition, hot removal, hot-plug capability, etc.

Consequently, implementation of hot-plug capability within enterprise server class systems is a vital RAS feature. Hot-plug capability allows upgrades and repair of nodes within a system without bringing the system down or rebooting. As a result, the ability to hot-plug various parts of a computer system, such as processors, memory, I/O (input/output) boards, modules, etc. is beneficial for replacing defective parts, performing system upgrades and the like.

Hot-plug of CPU/memory refers to the ability to add/remove/replace a processor/memory node while the operating system (O/S) continues to run on the platform. Similarly, the hot-plug of an I/O node is the ability to add/remove/replace an I/O node consisting of multiple peripheral component interconnect (PCI) root bridges and bus segments while the O/S continues to run. Those skilled in the art will recognize that hot-plug of CPU/memory, I/O node (hot-plug of I/O node distinguished from PCI hot-plug by the fact that multiple root bridges are being hot-plugged) is a feature that is not supported by current system architectures and operating systems.

Currently, hot-plug of devices has been restricted to PCI devices. The ability to hot-plug PCI devices is provided by the PCI bus definition. Accordingly, the PCI bus definition provides two characteristics which enable the hot-plug of PCI devices. The PCI bus definition provides a mechanism for enumerating devices on a PCI bus via PCI configuration mechanisms. In addition, the PCI bus definition provides a mechanism for enumerating the resources needed by a PCI device via the PCI base address registers (BARs) in the device PCI configuration space.

As described above, hot-plugging refers to the capability of a device to be added/removed to/from a computer system while the system is powered on and running an operating system without significantly affecting the tasks currently executing on the system. Based on the PCI bus definition characteristics described above, two characteristics are required by an operating system for hot-plug of a device. First, the device must be enumerable. Second, the device resources must be enumerable.

In other words, a software mechanism is required that the O/S can use to detect when the device is hot added or detect when a device is removed. Furthermore, the resources of the device are required to be enumerable before the device decodes any of the resources (memory space, I/O, configuration IDs) that the currently-running operating system is aware of. Likewise, the hot-plug device cannot use any of the resources that the running system is using until the operating system knows what device is being hot-plugged. Once hot-plug is detected, enumeration of the resources that the hot-plugged device will be using is required.

Unfortunately, current operating systems do not support the hot-plug of processor/memory nodes. This is due to the fact that no mechanisms for the enumeration of processor memory/nodes are available/defined. In addition, standard mechanisms for enumeration of the resources required by processor/memory nodes are not available. Since the characteristics described above for enabling hot-plug of a device are not provided by processor/memory nodes, implementation of a mechanism for supporting hot-plug of processors and memory nodes would potentially require the definition of a new bus interface for enumeration of processors.

Therefore, there remains a need to overcome one or more of the limitations in the above-described existing.

BRIEF DESCRIPTION OF THE DRAWINGS

The present invention is illustrated by way of example, and not by way of limitation, in the figures of the accompanying drawings and in which.

DETAILED DESCRIPTION

Figure 1:
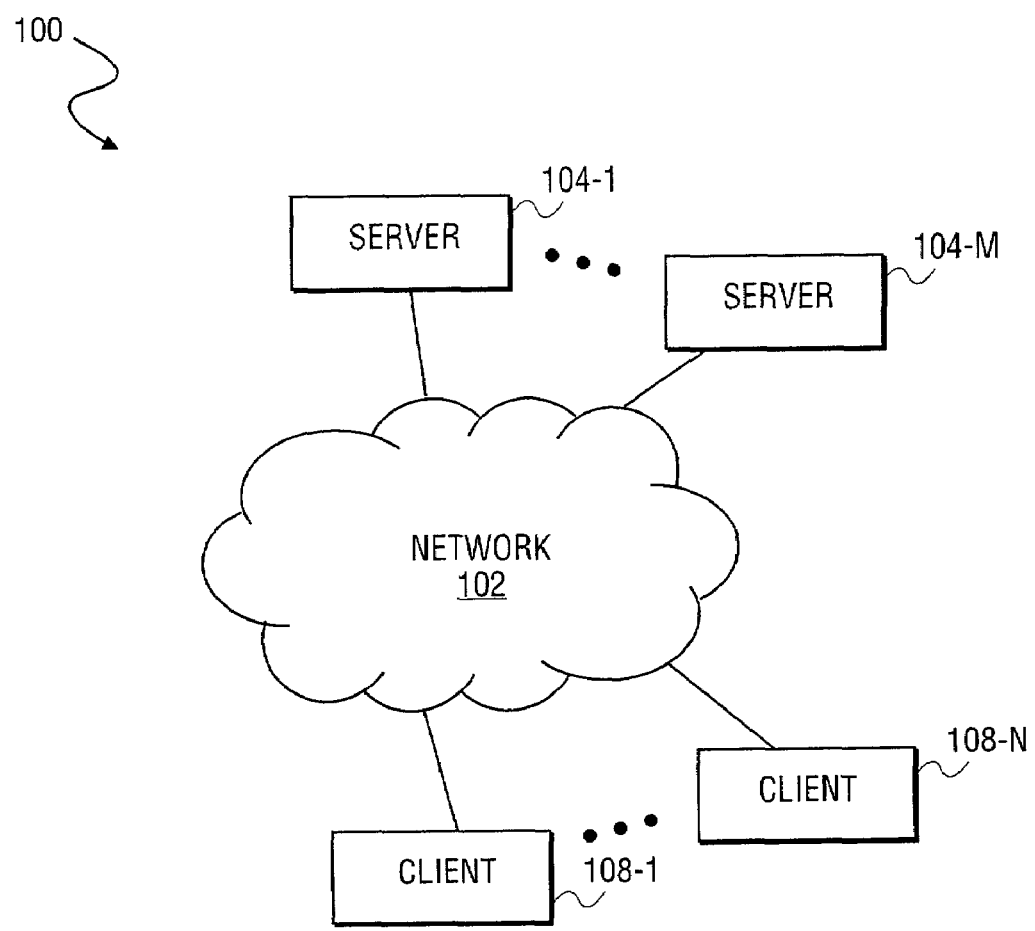
FIG. 1 depicts a block diagram illustrating a network computer environment as known in the art.

A method and apparatus for enumeration of processors during hot-plug of a compute node are described. The method includes the enumeration, in response to a hot-plug reset, of one or more processors. The enumeration is performed by the operating system running on a system in which a processor/memory node is hot-plugged. Once enumeration is complete, the processor/memory node is started in response to an operating system activation request. Accordingly, once device enumeration, as well as resource enumeration are complete, the one or more processors of the processor/memory node are activated, such that the operating system may begin utilizing the processors of the hot-plug processor/memory node.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable storage medium having stored thereon instructions which may be used to program a computer (or other electronic devices) to perform a process according to the present invention. The computer-readable storage medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable storage medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client)via a computer-readable transmission medium. The transfer of the program may be by way of data signals embodied in a carrier wave or other computer-readable transmission medium via a communication link (e.g., a modem, network connection or the like).

System Architecture

Referring now to FIG. 1, FIG. 1 depicts a network environment 100 in which the techniques of the present invention may be implemented. As shown, the network environment includes several computer systems such as a plurality of servers 104 (104-1, . . . , 104-M) and a plurality of clients 108 (108-1, . . . , 108-N), connected to each other via a network 102. The network 102 may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
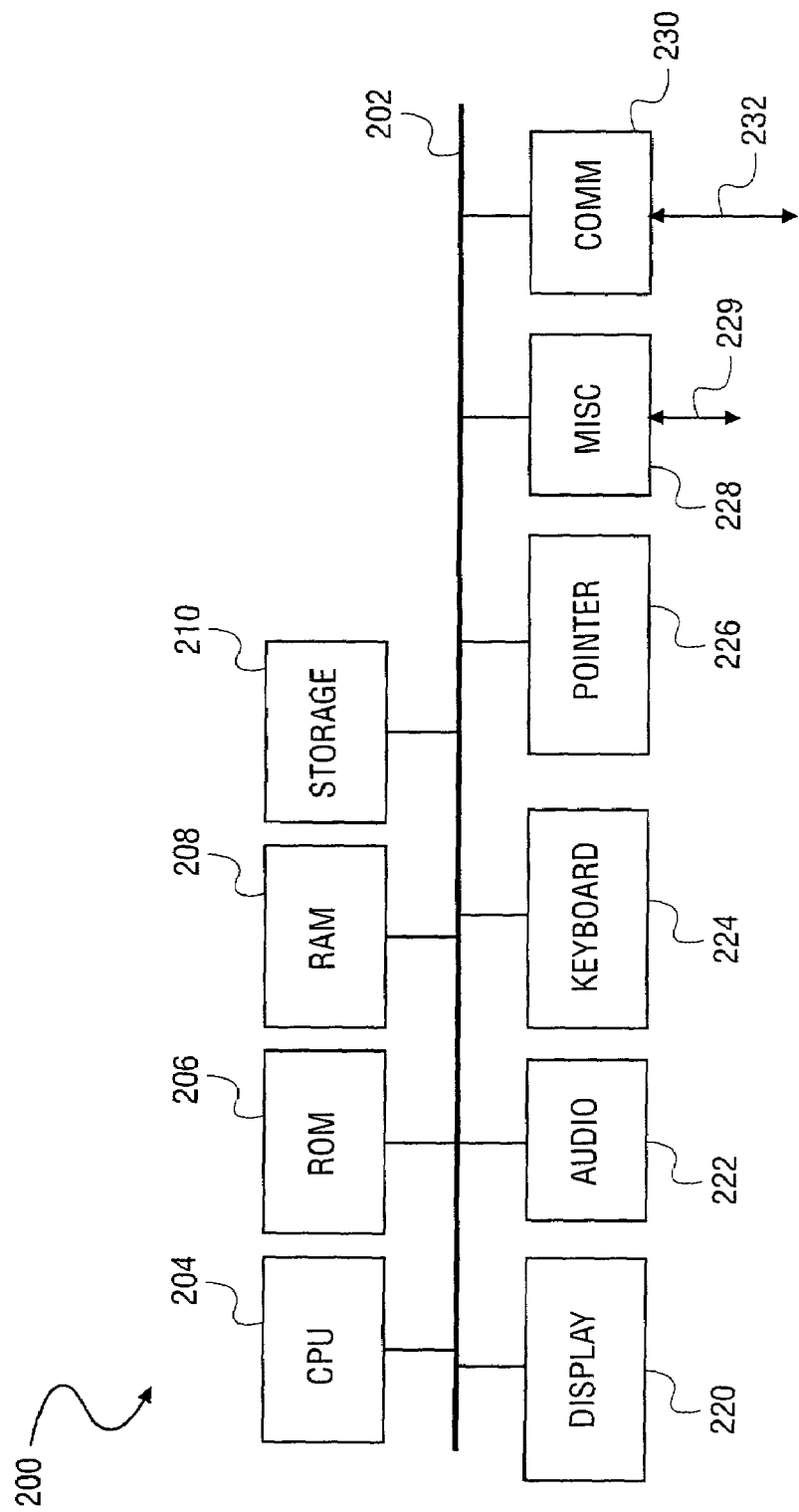
FIG. 2 depicts a block diagram illustrating a conventional computer system.

Referring to FIG. 2, FIG. 2 illustrates a conventional personal computer 200 in block diagram form, which may be representative of any of the clients 108 and servers 104, shown in FIG. 1. The block diagram is a high level conceptual representation and may be implemented in a variety of ways by various architectures. The computer 200 includes a bus system 202, which interconnects a Central Processing Unit (CPU) 204, a Read Only Memory (ROM) 206, a Random Access Memory (RAM) 208, a storage 210, a display 220, an audio 222, a keyboard 224, a pointer 226, miscellaneous input/output (I/O) devices 228, and communications 230.

The bus system 202 may be for example, one or more of such buses as a system bus, Peripheral Component Interconnect (PCI), Advanced Graphics Port (AGP), Small Computer System Interface (SCSI), FireWire, etc. The CPU 204 may be a single, multiple, or even a distributed computing resource. The ROM 206 may be any type of non-volatile memory, which may be programmable such as, mask programmable, flash, etc.

In addition, RAM 208 may be, for example, static, dynamic, synchronous, asynchronous, or any combination. The storage 210 may be Compact Disc (CD), Digital Versatile Disk (DVD), hard disks (HD), optical disks, tape, flash, memory sticks, video recorders, etc. While the display 220 might be, for example, a Cathode Ray Tube (CRT), Liquid Crystal Display (LCD), a projection system, Television (TV), etc. Audio 222 may be a monophonic, stereo, three dimensional sound card, etc.

The keyboard 224 may be a keyboard, a musical keyboard, a keypad, a series of switches, etc. The pointer 226, may be, for example, a mouse, a touchpad, a trackball, joystick, etc. While the I/O devices 228 may be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MDI) card with the I/O port 229 connecting to the musical instrument(s).

The communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. While the external connection port 232 may provide for any interconnection, as needed, between a remote device and the bus system 202 through the communications device 230.

For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, the plurality of clients 108 are effectively connected to web sites, application service providers, search engines, and/or database resources represented by servers, such as the plurality of servers 104, via the network 102. The web browser and/or other applications are generally running on the plurality of clients 108, while information generally resides on the plurality of servers 104. For ease of explanation, a single server 104, or a single client 108-1 will be considered to illustrate one embodiment of the present techniques. It will be readily apparent that such techniques can be easily applied to multiple clients, servers, or the like.

Figure 3:
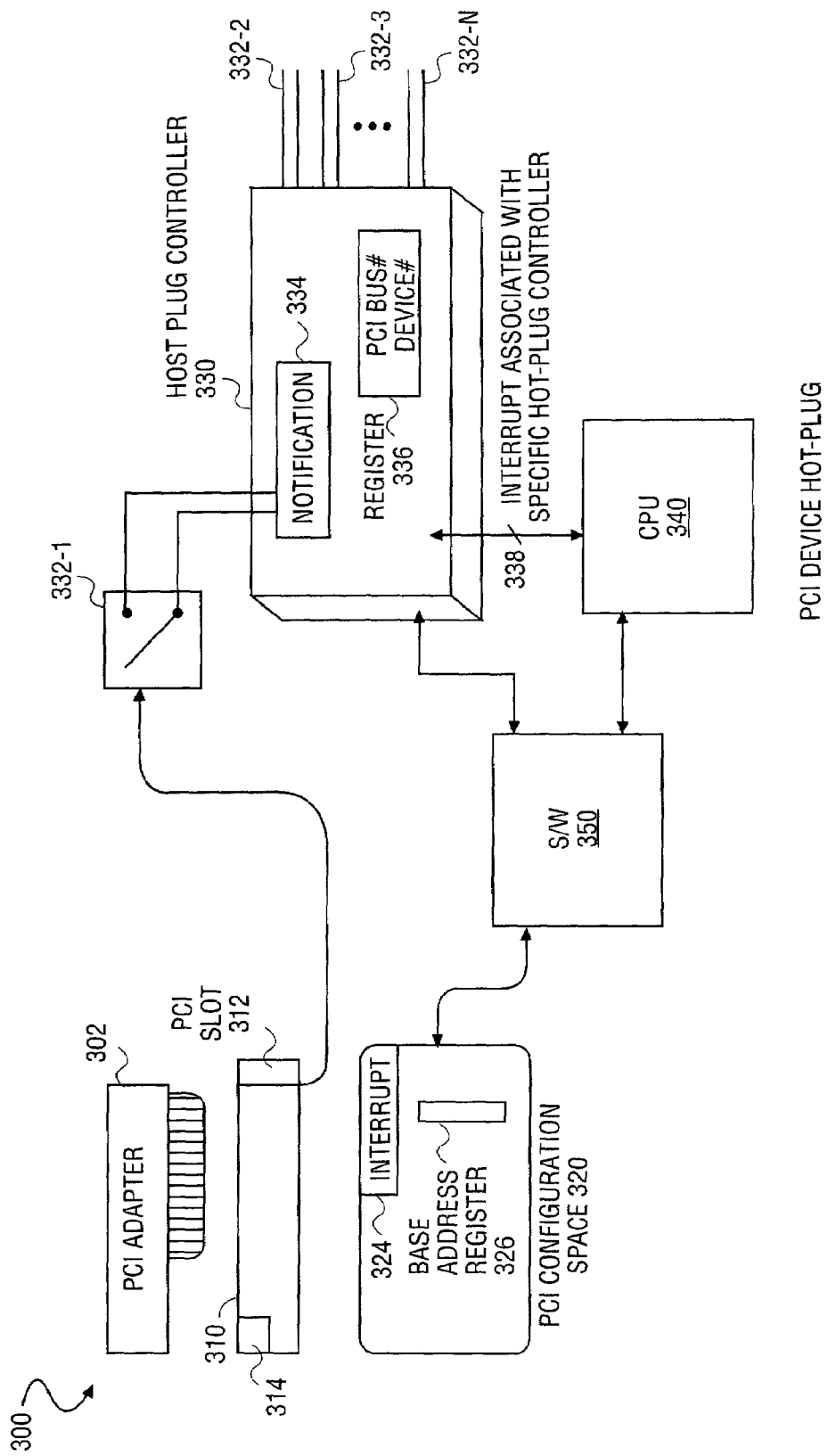
FIG. 3 depicts a block diagram illustrating hot-plug of a PCI device as known in the art.

Referring now to FIG. 3, FIG. 3 depicts a block diagram illustrating hot-plug of a PCI device, for example within the computer 200, as depicted in FIG. 2. As described above, conventional device hot-plug has been restricted to PCI devices. In order to enable PCI hot-plug, the PCI bus definition provides two characteristics, which are required for hot-plug of a device: (1) the PCI bus definition provides a mechanism for enumerating devices on a PCI bus via the PCI configuration mechanisms; and (2) the PCI bus definition provides a mechanism for enumerating the resources needed by a PCI device via the PCI base address registers (BARs) and the device PCI configuration space.

Accordingly, as depicted in FIG. 3, a PCI adapter 302 may be plugged into a PCI slot 312. In the embodiment described, the mechanical closing of the switch 314 of the PCI slot signals an interrupt to a hot-plug controller 330. As such, once the hot-plug controller 330 receives an interrupt via, for example switch 332, a notification block of the hot-plug controller 334 provides an interrupt to a CPU 340. As illustrated, the hot-plug controller 334 includes a register 336 which indicates the PCI bus number as well as the device number of the hot-plugged device. This information is provided via the interrupt 338 to the CPU 340. In addition, the interrupt is also provided to software 350, which utilizes the PCI configuration space 320 in order to examine the base address registers 326 within the PCI configuration space 320.

Accordingly, based on analysis of the BAR 326, the software 350 is able to enumerate the required resources of the PCI device and also provide access to the hot-plug device to the resources available from the computer 200. Consequently, as depicted in FIG. 3, device enumeration is provided by the hot-plug controller 334, whereas resource enumeration is provided by the base address registers 326, both of which are enabled by the PCI bus definition. Unfortunately, hot-plug of non-PCI devices, such as processor nodes, is unsupported by conventional systems.

Figure 4:
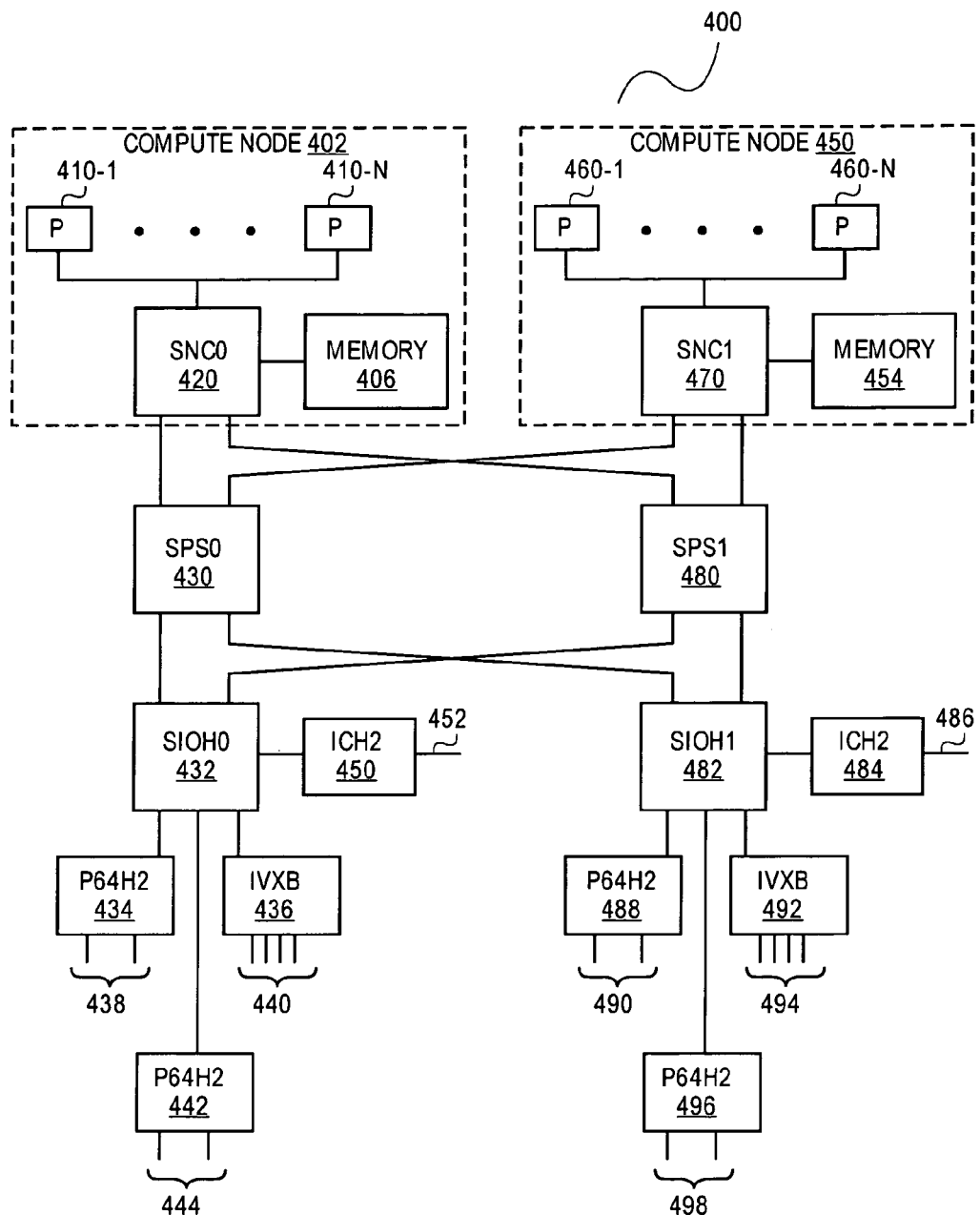
FIG. 4 depicts a block diagram illustrating a system wherein the present invention may be practiced, in accordance with an embodiment of the present invention.

Referring now to FIG. 4, FIG. 4 illustrates one embodiment of a system 400 where the present invention may be practiced. FIG. 4 is a block diagram illustration of an 8-way server architecture. Compute node 402 includes a plurality of processors (P) 410 (410-1, . . . , 410-N) linked to a Scalable Node Controller (SNC0) 420 and a plurality of other processors (P) 460 (460-1, . . . , 460-N) linked to SNC1 470. SNC0 420 controls the interfaces to the switches SPS0 430 and SPS1 480, and is also a memory controller interfacing to the memory 406. Likewise, SNC1 470 controls the interfaces to the switches SPS1 480 and is also a memory controller interfacing to the memory 454. The switches SPS0 730 and SPS1 780 are Scalability Port Switches (SPS) and act as a switch between compute (processor/memory) nodes 402 and 450 and I/O nodes (SIOH0 432 and SIOH1 482).

The Server I/O Hubs (SIOH), SIOH0 432 and SIOH1 482 may serve as root-PCI bridges. SIOH0 432 and SIOH1 482 link respectively to I/O controller Hub 2 (ICH2) 450 and 484, ICH2 450 links via 452, and ICH2 484 links via 486. In one embodiment, SIOH0 432 and SIOH1 482 link to, for example, various legacy devices, such as USB devices, AC'97 devices, etc. ICH2 434 and ICH2 484 may also control power management interfaces.

SIOH0 432 and SIOH1 482 also link to PCI-IBA (infiniband) bridges, IVXB 436 and 492 and via links 440 and 494 to devices. Also shown in this embodiment, SIOH0 432 and SIOH1 482 also link to PCI 64 Hub2 devices (P64H2) 434, 442, and 488 and 496. The P64H2 has two PCI to PCI bridges, two PCI Hot-plug controllers and two I/O Advanced Programmable Interrupt Controllers. Thus, P64H2 442 interfaces to devices via links 444, P64H2 434 interfaces to devices via links 438, P64H2 496 interfaces to devices via links 498, and P64H2 488 interfaces to devices via links 490.

What is to be appreciated is that in a system, such as that illustrated in FIG. 4, hot-plug of compute nodes 402/450 is not supported. For example, in a fully functional system, failure of a compute node 402/450 would require shut-down of the entire system 400 in order to replace the defective node. Moreover, system upgrades and repairs of compute node requires system shutdown unless hot-plug of compute nodes is supported. Unfortunately, hot-plug of compute nodes would require a new bus definition in order to provide device, as well as resource enumeration, required for device hot-plug.

Referring now to FIG. 5A, FIG. 5A further illustrates the compute node 402 as the computer system 400 as depicted in FIG. 4. For the reasons described above, hot-plug of compute node 402 within the computer system 400 as depicted in FIG. 4, is currently not supported by conventional systems. However, based on the characteristics required for a PCI hot-plug, the following characteristics are provided in order to support hot-plug of a compute node. First, the present invention provides a mechanism for device enumeration. In one embodiment, a software mechanism is provided that the operating system of the computing system 400 can use to detect when a compute node is hot-plugged or hot added or detect when the compute node is removed.

In addition, the present invention describes a mechanism for enumeration of compute node resources. As described above, resources are required to be enumerable before a device decodes any of the resources (memory space, I/O space, etc.) that the currently running operating system is aware of. In other words, the hot-plugged device cannot use any of the resources that the running system is using until the operating system knows what device is being hot-plugged and what resources the hot-plugged device will be using.

Accordingly, the device enumeration and resource enumeration techniques, in accordance with one embodiment of the present invention, are as follows. In one embodiment, the configuration space of a PCI device associated with a hot-plugged compute node is used to register the presence/absence of a processor coupled to the compute node. In one embodiment, this is performed by exposing the device presence and absence via an appropriate power management specification, such as for example the Advanced Configuration and Power Management Interface (ACPI) mechanisms.

As indicated above, the PCI device for a compute node is the scalable node controller (SNC0) 420 and the available space refers to, for example, CPUKILL bits of a CPUKILL register 426, which are contained in a system reset register 425 of the PCI configuration space of SNC0 420. In the embodiment described, the CPUKILL bits are used to reflect the presence of processors on the compute node. Accordingly, in one embodiment, the BIOS that runs on SNC0 420, prior to its joining the running system, is responsible for detecting the presence of processors via the existing native architectural mechanisms (conventional techniques) and reflecting this presence/absence in the CPUKILL bits.

In addition, a dynamic mechanism is provided for identifying the processor resources. In one embodiment, the processor resources are identified via information in the configuration space of a PCI device associated with the compute node. As indicated above, the relevant PCI device is the scalable node controller (SNC0 420/SNC1 470). In the embodiment described, the O/S visible processor resource is the processor's advanced programmable interrupt controller (APIC) identification (APIC ID).

Accordingly, as depicted in FIG. 5B, the processor 410 includes an APIC 412 region, which contains an APIC ID register 414. As such, a dynamic mechanism is provided for resetting an APIC ID of each hot-plugged processor with a unique ID that is generated in response to a hot-plug reset. In one embodiment, the unique APIC ID uses the node ID 424 of SNC0 420 and a CPUKILL bit number that represents the respective processor. As such, in the embodiment described, the APIC ID is 8 bits and is formed by concatenating the 5 bit node ID 424 along with the 3 bits of the CPUKILL bits corresponding to the processor.

As such, due to the fact that the SNCs node ID 424 is unique in the entire system, the combination yields the system-wide unique APIC ID for each respective hot-plugged processor. However, in an alternate embodiment, the combination of the PCI bus number and a device number can be used instead of the node ID due to the fact that the combination will be unique throughout the given PCI segment. In addition, the standard ACPI mechanisms for reporting device resources uses this dynamic mechanism for reporting APIC IDS of the device to the operating system.

Referring again to FIG. 5A, the compute node 402 will be activated to run the system BIOS in response to a hot-plug reset instruction. In one embodiment, hot-plug detection of a processor memory node is performed by an intelligent agent which detects, for example locking of a switch (not shown) when the compute node is plugged into, for example SPS1 480, as depicted in FIG. 4. As such, once detected, the agent will issue the hot-plug reset in order for the BIOS to detect one or more processors coupled to the compute node.

Accordingly, in the embodiment described, the BIOS will set the CPUKILL register for each detected processor. Once detected, the various APIC IDs of each processor is set and is a combination of the node ID 424 and the CPUKILL bits representing the respective processor. Once performed, the BIOS may initiate a handshake with a running system of the system architecture in which the compute node is being hot-plugged, for example as depicted in FIG. 4.

In one embodiment, the BIOS will set a scalability port interface control (SPINCO) register bit to enable a link 404, to a scalability port switch, such as for example SPS0 430 or SPS1 480. Accordingly, in response to setting of the SPINCO register, the compute node 402 may issue an interrupt. In one embodiment, a system control interrupt (SCI) is issued to the running operating system. In response to the SCI, the O/S may launch a platform subsystem, such as for example, an ACPI subsystem. Once launched, an ACPI event notification may be provided to the ACPI subsystem to initiate an enumeration procedure.

In one embodiment, this enumeration procedure will then read the relevant chipset boot configuration (CBC) registers 422 and CPUKILL registers 426 in order to enumerate each of the processors coupled to the hot-plug compute node 402, and update a device structure. In one embodiment, the device structure is read by the operating system in order to receive enumeration of the hot-plug processors, as well as resources utilized by the hot-plugged processors. In one embodiment, the device structure is a Multiple APIC Table entry (MAT) as provided by the BIOS in the system ACPI tables. Details of the MAT method are available in the ACPI 2.0 specification.

As such, the running operating system may use the device data structure, and once the relevant device, as well as resources are ascertained, may issue a system initialization request to the compute node in order to begin running of the one or more processors 410 coupled thereto. As such, the present invention exposes device presence and absence via the appropriate ACPI mechanisms and utilizes a dynamic mechanism for identifying processor resources via information in the configuration space of a scalable node controller. Therefore, hot-plug of compute nodes, for example, as depicted in FIGS. 4 and 5A is enabled by the present invention.

Figure 6:
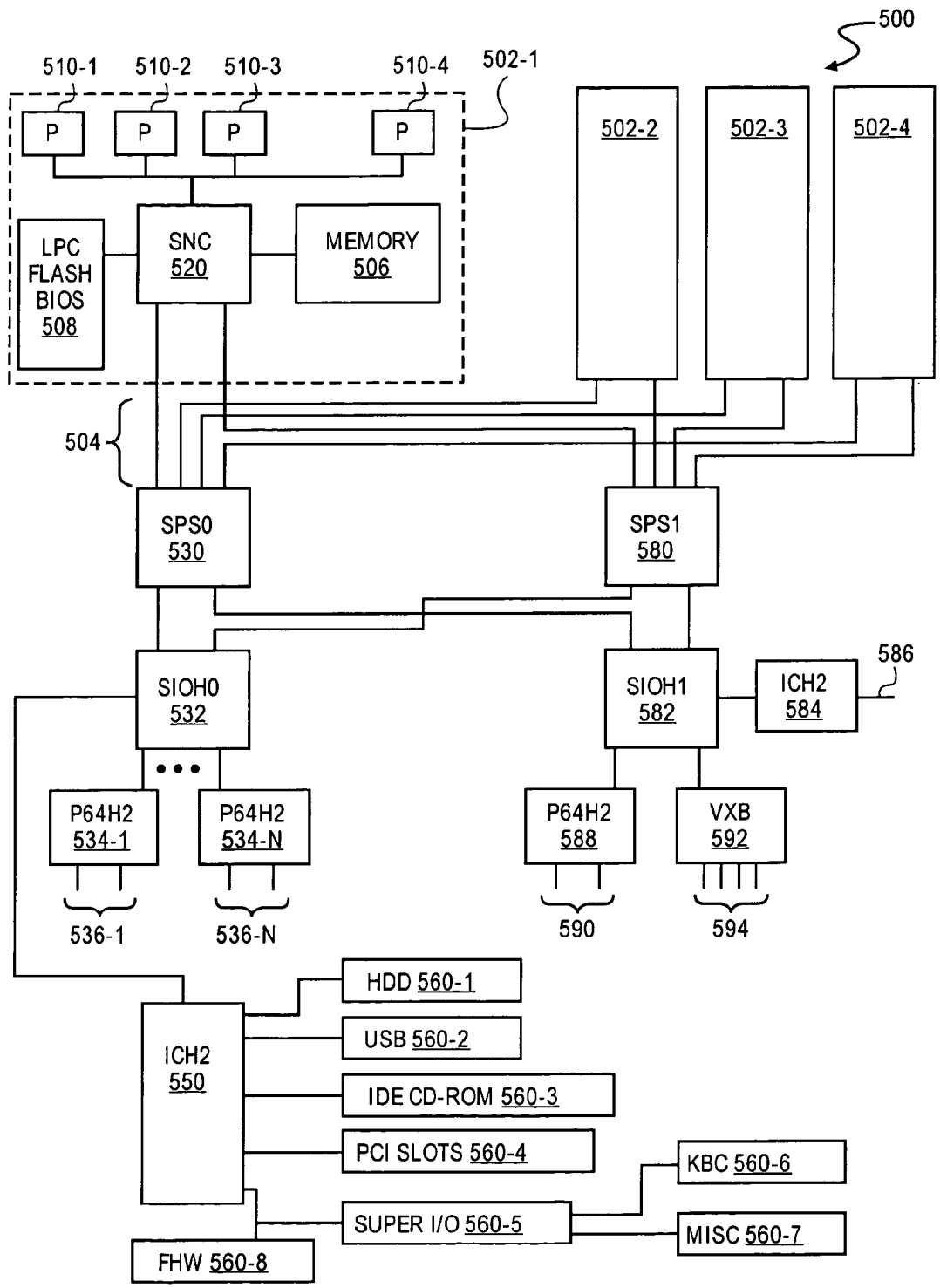
FIG. 6 depicts a block diagram illustrating a further embodiment of a system wherein the present invention may be practiced.

FIG. 6 illustrates another embodiment of a system 500 where the present invention may be practiced. FIG. 6 is a block diagram illustration of an 8-way server system architecture with four, four processor nodes. The four processor nodes are 502 (502-1, . . . , 502-4). Node 502-1 is illustrated in more detail where four processors (P) 510 (510-1, . . . , 510-4) are linked to a Scalable Node Controller (SNC) 520 as well as a memory 506 and a LPC (low pin count) flash bios 508. Note that the processors (P) may also have available a local memory for their own use, such as a Level 2 cache. SNC 520 interfaces to the switches SPS0 530 and SPS1 580.

Likewise, the other nodes, 502-2-502-4 have SNCs that interface to the switches SPS0 530 and SPS1 580, and also the processors P, memory, and an LPC flash bios. The switches SPS0 530 and SPS1 580 are Scalability Port Switches (SPS) and act as a switch between compute (processor/memory) nodes (502) and I/O nodes (SIOH0 532 and SIOH1 582). The Server I/O Hubs (SIOH), SIOH0 532 and SIOH1 582 serve as root-PCI bridges. SIOH0 532 and SIOH1 582 link respectively to I/O controller Hub 2 (ICH2) 550 and 584.

ICH2 550 has links to a variety of possible devices and/or busses. Examples are, hard disk drives (HDD) 560-1, USB 560-2, IDE CD-ROM 560-3, PCI slots 560-4, Super I/O 560-5 and firmware hub FWH 560-6. Note that these devices and/or busses may have connected to them other devices and/or busses. For example, Super I/O 560-5 has connected to it a keyboard controller KBC 560-6, and miscellaneous (Misc) devices 560-7. These miscellaneous devices might be, for example, various legacy devices, such as, AC'97 devices, power control management devices, etc. Likewise, ICH2 584 may interface via link 586 to various devices and/or busses.

SIOH1 582 is shown linking to a VXB 592 bridge with links 594. The VXB 592 may be, for example, an NGIO bridge (Next Generation I/O) with links 594 representing NGIO channels. Also shown in this embodiment, SIOH0 532 and SIOH1 582 also link to PCI 64 Hub2 devices (P64H2) 534-1 through 534-N, and 588. The P64H2 has two PCI to PCI bridges, two PCI hot-plug controllers and two I/O Advanced Programmable Interrupt Controllers. Thus, P64H2 534-1 through 534-N would interface to devices via links 536-1 through 536-N respectively.

Figure 7:
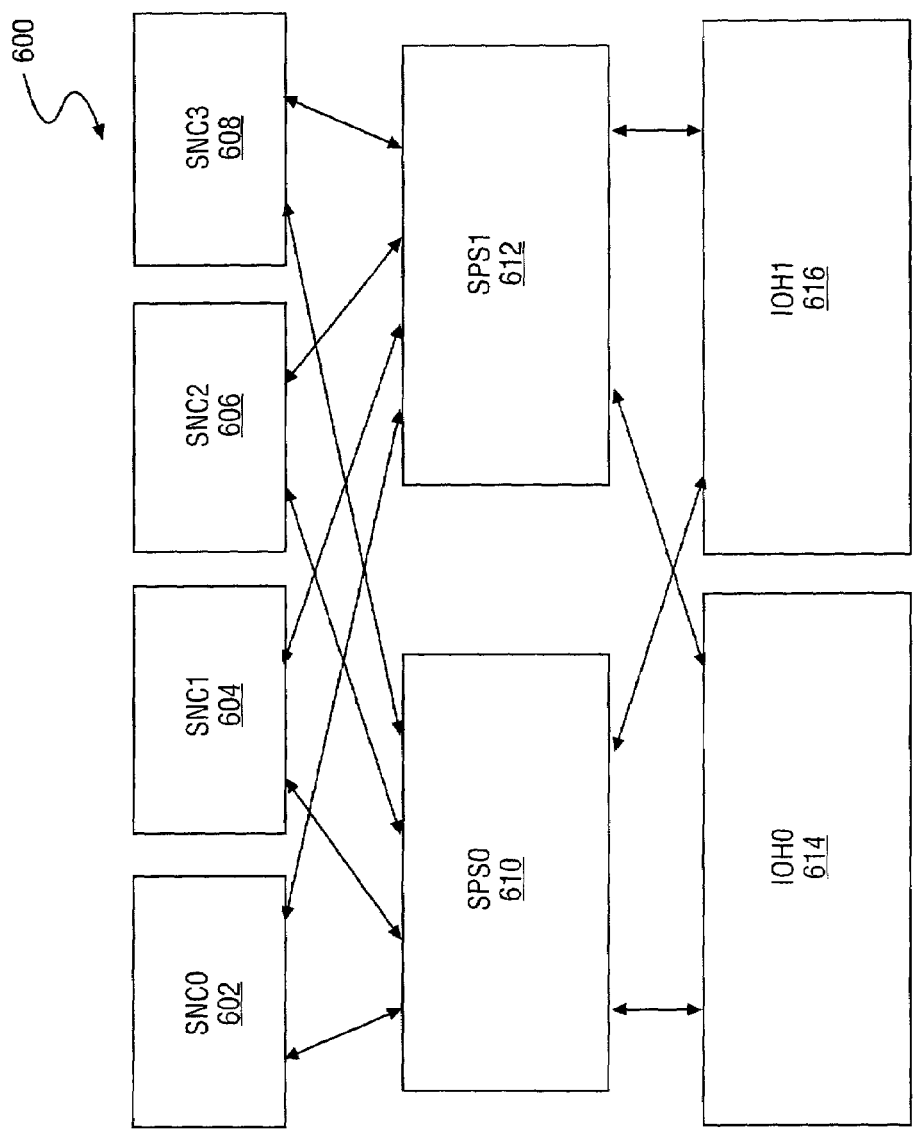
FIG. 7 depicts a block diagram illustrating a bus hierarchy of a system configuration in accordance with a further embodiment of the present invention.

FIG. 7 illustrates a bus hierarchy 600 for one embodiment of a system configuration. Here, four node SNCs are denoted as SNC0 602, SNC1 604, SNC2 606, and SNC3 608. Two SPSs are denoted as SPS0 610 and SPS1 612. Each SNC (601-608), is connected to each SPS 610 and 612. Next, each SPS 610 and 612 is connected to each IOH (I/O Hub) IOH0 614 and IOH1 616. Here, each SNC, SPS, and IOH may contain registers for holding information such as node ID, bus type, etc. Additionally, the IOHs may be connected to other busses, for example, as series of PCI busses through such devices as bridges, hub links, etc.

What is to be appreciated from the illustration of FIG. 7 is the ability, by using information, that is accessible from the SNC or the processor (See FIG. 5) to enumerate compute node hot-plug detection as well as resource information as described above. This device information may be obtained dynamically, allowing the operation system and/or software to enumerate hot-plug of compute nodes as well as enumeration of processor resources in order to begin utilization of the hot-plugged compute nodes by the operating system.

Accordingly, the present invention describes techniques for enumeration of processors coupled to a hot-plugged compute node. In addition, a unique ID is set as a processor ID of each detected processor. This mechanism for setting the processor ID of each detected processor enables device enumeration by an enumeration procedure which is provided by an ACPI subsystem. Accordingly, the enumeration procedure will determine each detected processor and the detected processor's ID via various configuration registers contained within the compute node.

Once determined, the enumeration procedure will update a device structure in order to provide device enumeration and resource enumeration of the processors of the hot-plug compute node to the running operating system. By providing this information, the running operating system may begin running the processors and utilizing the processors in order to assign tasks thereto. As such, the techniques described herein avoid implementing of a new PCI definition for supporting hot-plug of processor-memory nodes. Procedural methods for implementing the teachings of the present invention are now described.

Operation

Figure 5:
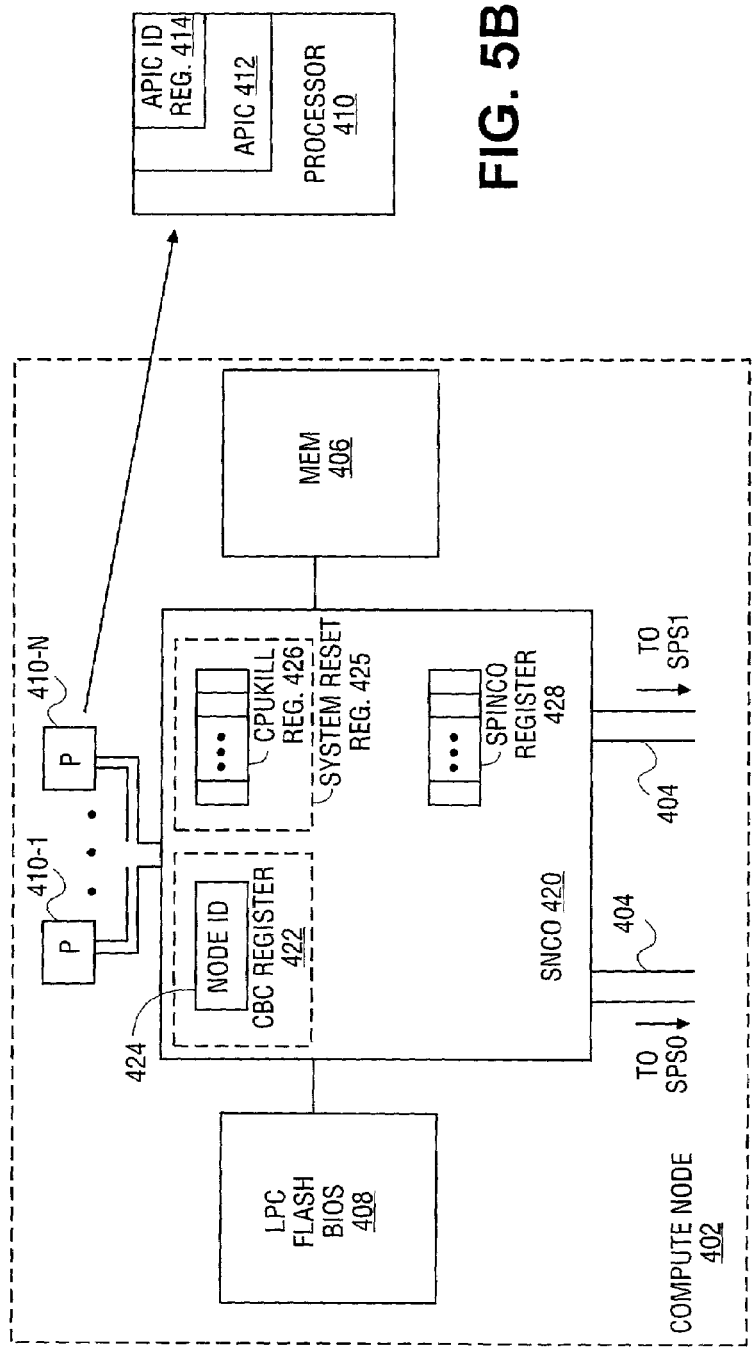
FIGS. 5A and 5B further illustrate a compute node as depicted in FIG. 4 in accordance with a further embodiment of the present invention.
Figure 8:
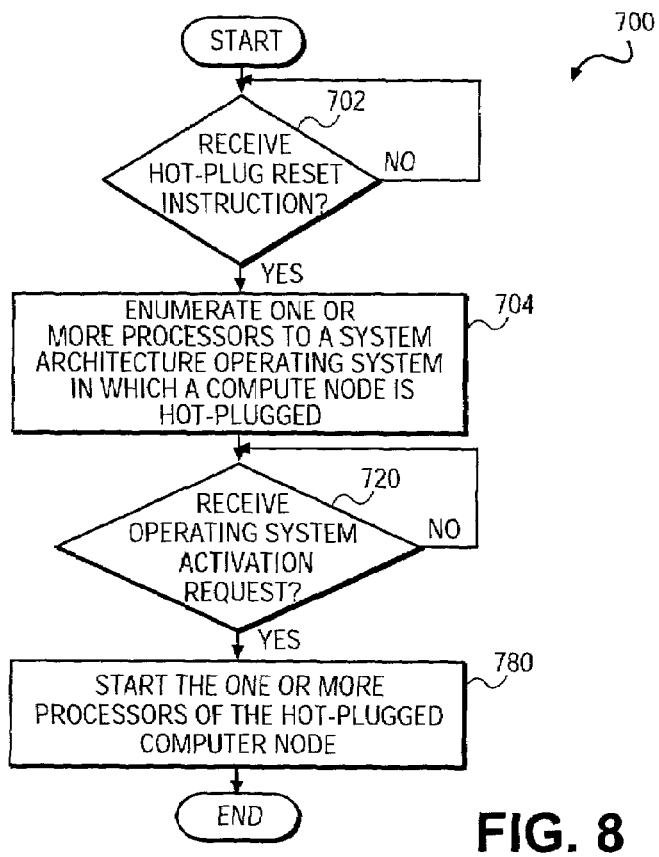
FIG. 8 depicts a flowchart illustrating a method for enumeration of processors during hot-plug of a compute node in accordance with an embodiment of the present invention.

Referring now to FIG. 8, FIG. 8 depicts a flowchart illustrating a method 700 for performing device enumeration of one or more processors coupled to a hot-plugged processor/memory node 402/450, for example as depicted in FIGS. 4-6. At process block 702, it is determined whether a hot-plug reset instruction has been received. Once received, process block 704 is performed. At process block 704, enumeration of one or more processors by the operating system in which a compute node (e.g., 402) is hot-plugged is conducted.

In the embodiment described, the enumeration is essentially provided to an enumeration procedure of a power management subsystem, such as for example the ACPI specification, which can query the various PCI configuration registers of the hot-plugged compute node. Using the configuration registers, the procedure can determine IDs of each detected processor and enumerate this information, as well as processor resources, to a running operating system. Accordingly, once the device as well as resource enumeration is provided to the operating system, utilization of the one or more hot-plugged processors by the running operating system can begin.

Next, at process block 720, it is determined whether an operating system activation request is received. Once the activation request is received, process block 780 is performed. At process block 780, the one or more processors of the hot-plugged compute node are started. As such, receipt of the activation request indicates that enumeration of the detected devices or hot-plugged devices, as well as the respective resources of the devices, has been completed by the operating system. As such, the operating system has, in one embodiment, queried a device structure which is populated with relevant device and resource information which enables the running operating system to begin utilizing the processors and assigning tasks to the processors.

Figure 9:
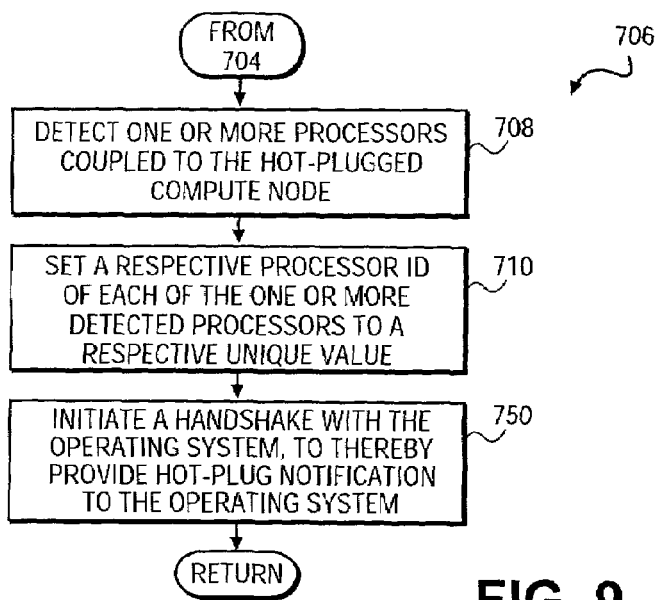
FIG. 9 depicts a flowchart illustrating an additional method for enumerating detection of one or more processors in accordance with a further embodiment of the present invention.

Referring now to FIG. 9, FIG. 9 depicts a flowchart illustrating a method 706 for enumerating detection of one or more processors of process block 704 as depicted in FIG. 8. At process block 708, one or more processors coupled to the hot-plugged compute node are detected. Once detected, at process block 710, a respective processor ID of each of the one or more detected processors is set to a respective unique value. Next, at process block 750, the compute node will initiate a handshake with the running operating system of an architecture platform in which the compute node is being hot-plugged. In one embodiment, initiating of the handshake provides hot-plugged notification to the operating system.

Figure 10:
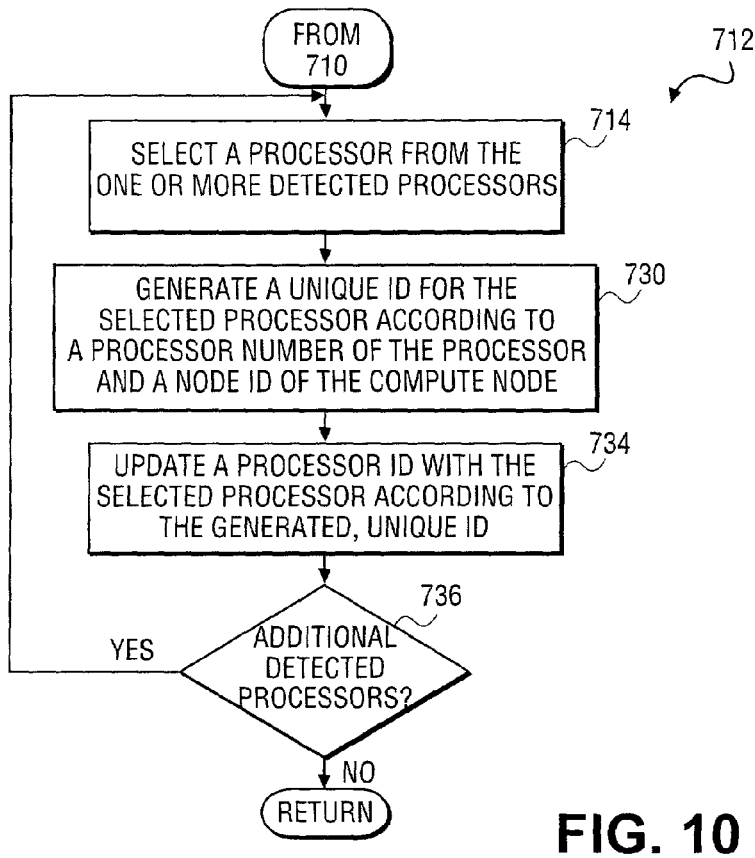
FIG. 10 depicts a flowchart illustrating an additional method for setting a processor ID of a detected processor in accordance with an embodiment of the present invention.

Referring now to FIG. 10, FIG. 10 depicts a flowchart illustrating an additional method 712 for setting a respective processor ID of process block 710 as depicted in FIG. 9. At process block 714, a processor is selected from the one or more detected processors. Once selected, at process block 730, a unique ID is generated for the selected processor according to a processor number associated with the processor and a node ID of the compute node. Accordingly, in the embodiment described, the processor number is a CPUKILL register value associated with the respective processor, while the node ID refers to a node ID 424 contained with the CBC register 422 of the scalable node controller (SNC0 420), as depicted in FIG. 5A.

Once a unique ID is generated for the selected processor, process block 734 is performed. At process block 734, a processor ID within the respective processor is updated according to the generated unique ID. As such, in the embodiment described, an APIC ID of the respective processor is set to the unique ID generated, for example by the system BIOS. Finally, at process block 736, process blocks 714-734 are repeated for each detected processor.

Figure 11:
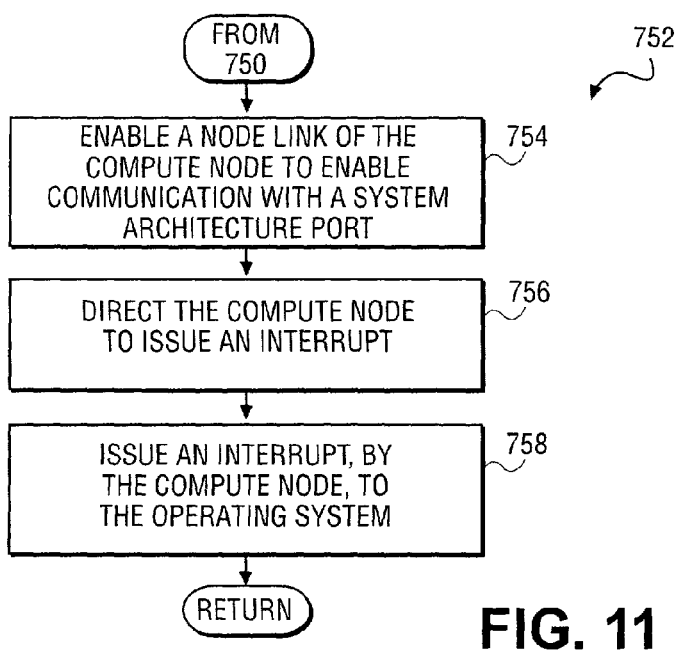
FIG. 11 depicts a flowchart illustrating an additional method for initiating a handshake with a running operating system in accordance with a further embodiment of the present invention.

Referring now to FIG. 11, FIG. 11 depicts a flowchart illustrating a method 752 for initiating a handshake with the running operating system of process block 750, as depicted in FIG. 9. At process block 754, a node link of the compute node is enabled to initiate communication with the system architecture port (See FIG. 4). Accordingly, in the embodiment described, a link of a scalable node controller is activated in order to initiate communication with a scalability port switch, such as for example SPS1 430. Once enabled, at process block 756, the compute node is directed to issue an interrupt. Finally, at process block 758, the compute node will issue an interrupt to the operating system via the scalability port switch.

Figure 12:
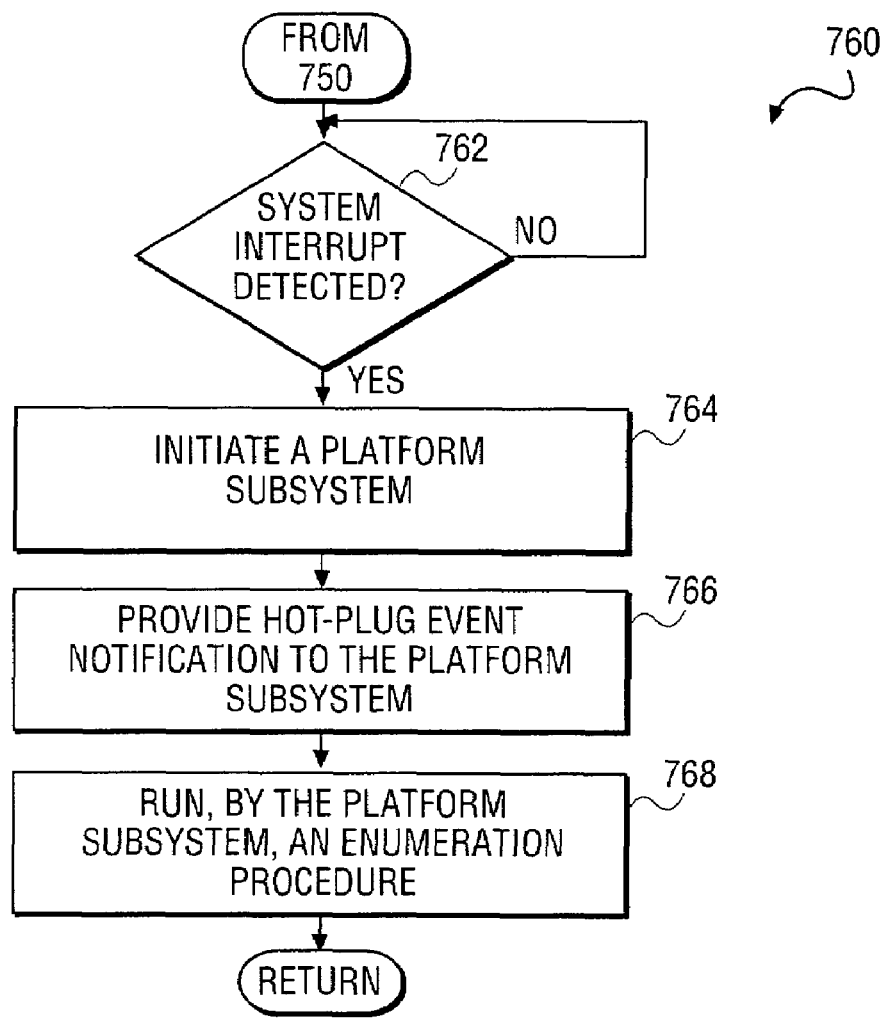
FIG. 12 depicts a flowchart illustrating an additional method for initiating a handshake with a running operating in accordance with an exemplary embodiment of the present invention.

Referring now to FIG. 12, FIG. 12 depicts a flowchart illustrating an additional method 760 for initiating a handshake with the running operating system of process block 750, as depicted in FIG. 9. At process block 762, it is determined whether a system interrupt is detected by the running operating system. Once detected, at process block 764, the running operating system will initiate a platform subsystem. In one embodiment, the platform subsystem refers to an ACPI subsystem. Next, at process block 766, hot-plug event notification is provided to the platform subsystem. In one embodiment, this is performed by detecting of a latched bit by the platform subsystem. Once notification is provided, at process block 768, the platform subsystem will run an enumeration procedure, which will perform device, as well as resource information, of the hot-plugged compute node.

Figure 13:
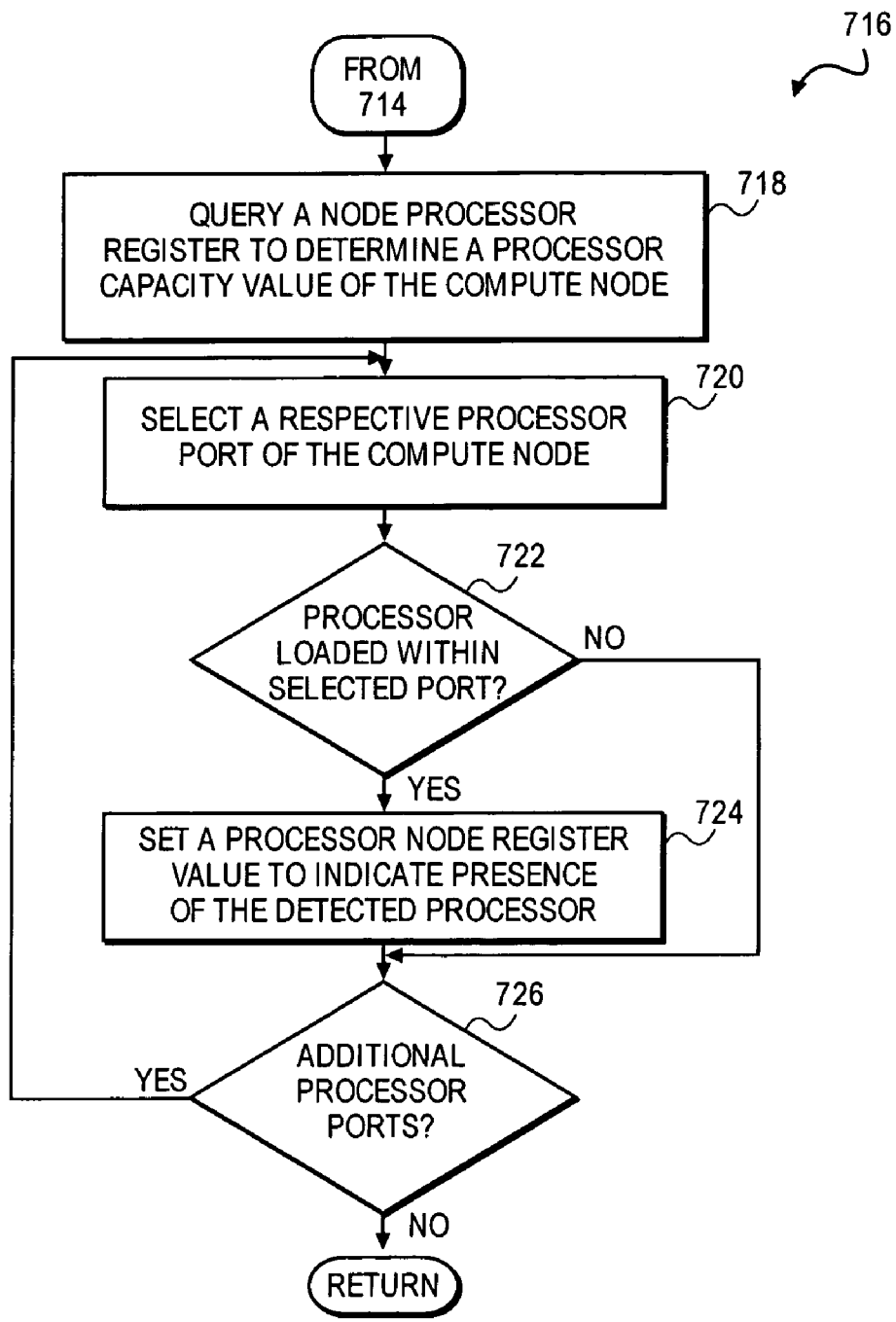
FIG. 13 depicts a flowchart illustrating an additional method for detecting one or more processors in accordance with an exemplary embodiment of the present invention.

Referring now to FIG. 13, FIG. 13 depicts an additional method 716 for detection of the one or more detected processors of process block 714. At process block 718, a node processor register of the hot-plugged compute node is queried to determine a processor capacity value of the compute note. In one embodiment, this is performed by analyzing the system reset register of the compute node. Within the reset register, a CPUKILL bits register contains a processor number associated with each processor port of the compute node and one or more bits for indicating whether a processor is coupled to the processor port of the compute node (See FIG. 5A).

Once the capacity value is determined, at process block 720, a respective processor port of the compute node is selected. Once selected, at process block 722, it is determined whether a processor is loaded with a selected port. Detection of the processor is performed in accordance with processor detection techniques as known to those skilled in the art. When a processor is loaded within the selected port, process block 724 is performed. At process block 724, a processor node register value is set to indicate presence of the detected processor. Finally, at process block 726, process blocks 720-724 are repeated for each of the processor ports.

Figure 14:
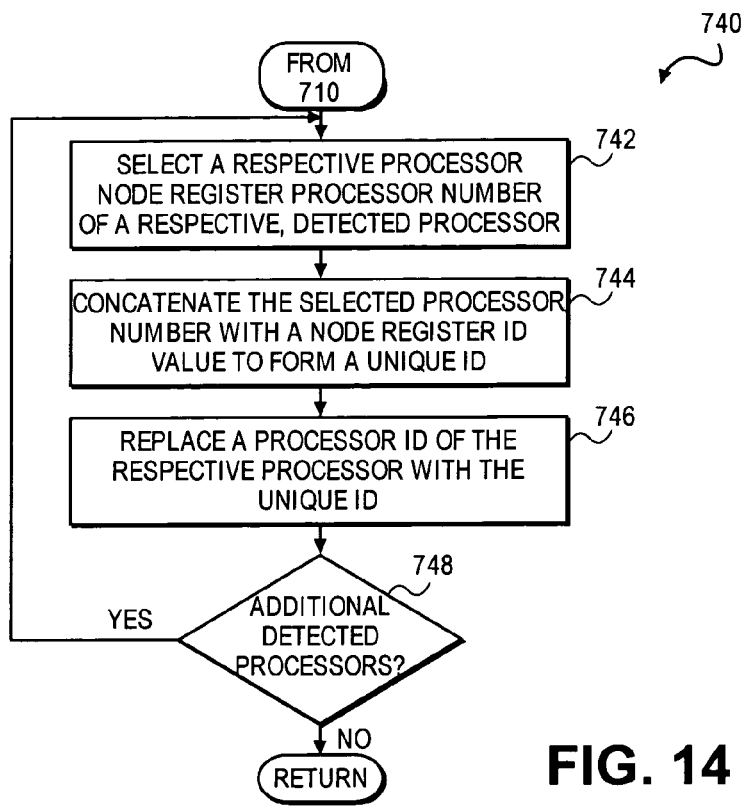
FIG. 14 depicts a flowchart illustrating an additional method for setting a processor ID of a detected processor in accordance with a further embodiment of the present invention.

Referring now to FIG. 14, FIG. 14 depicts an additional method 740 for setting a processor ID of each detected processor. At process block 742, a respective processor node register processor number is selected of the respective, detected processor. Once selected, at process block 744, the selected processor number is concatenated with a node register ID value to form a unique ID. Once formed, at process block 746, a processor ID of the respective processor is replaced with this unique ID. Finally, at process block 748, process blocks 742-746 are repeated for each detected processor. Accordingly, once completed, setting of each processor ID provides device enumeration to the running operating system, which in one embodiment is provided via an enumeration procedure initiated by a platform subsystem.

Figure 15:
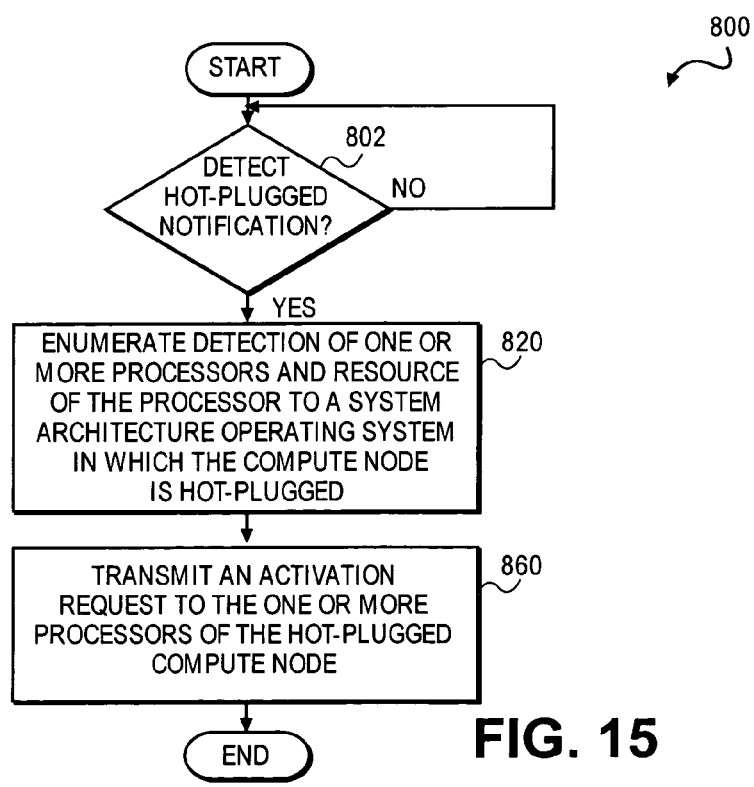
FIG. 15 depicts a flowchart illustrating a method for enumeration of processor resources following hot-plug of a compute node in accordance with one embodiment of the present invention.

Referring now to FIG. 15, FIG. 15 depicts a flowchart illustrating a method 800 for performing device as well as resource enumeration to a running operating system in response to hot-plug of a compute node within a system, for example as depicted in FIGS. 4-7. At process block 802, it is determined whether hot-plug notification is detected. Once detected, at process block 820, enumeration of one or more detected processors and resources of each of the detected processors are provided to a system architecture operating system, in which the compute node is hot-plugged.

Once enumeration of the hot-plugged devices, as well as resources of the hot-plugged devices are provided to the operating system, process block 860 is performed. At process block 860, an activation request is transmitted to the one or more processors of the compute node in order to direct the compute node to start each of the processors coupled to the compute node. Once started, the operating system may begin assigning tasks to each of the one or more detected processors in order to begin full utilization of the hot-plugged compute node.

Figure 16:
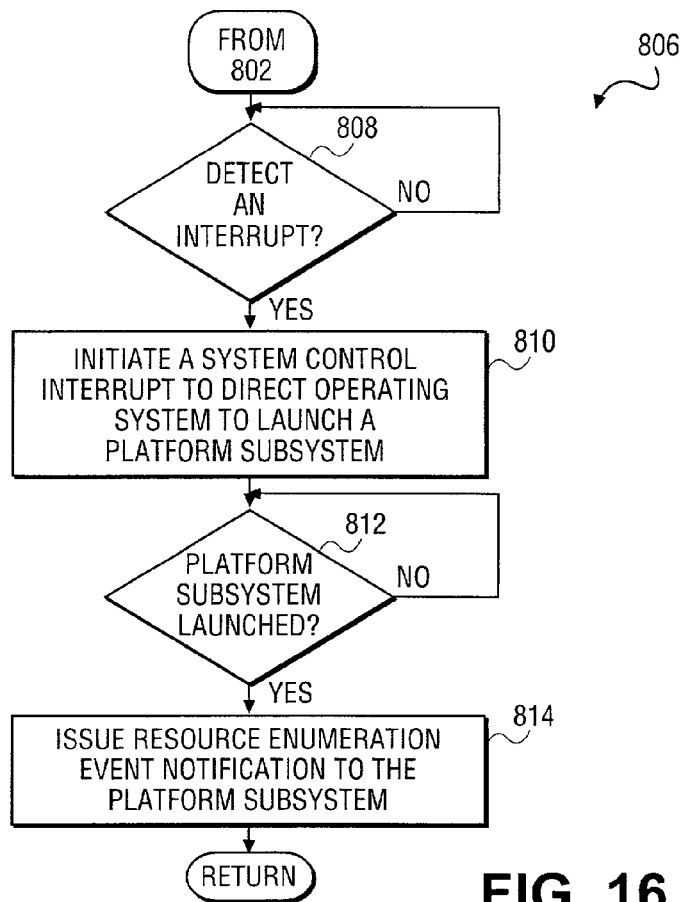
FIG. 16 depicts a flowchart illustrating an additional method for detecting hot-plug notification in accordance with a further embodiment of the present invention.

Referring now to FIG. 16, FIG. 16 depicts an additional method 806 for detection of hot-plug notification. At process block 808, it is determined whether an interrupt is detected. In one embodiment, the interrupt is a system control interrupt, which is issued by the hot-plugged compute node. Once detected, at process block 810 a system control interrupt is initiated to direct the running operating system to launch a platform subsystem, for example an ACPI platform subsystem, as described above. Next, at process block 812 it is determined whether the platform subsystem has been launched. Once launched, at process block 814, enumeration event notification is issued to the platform subsystem.

Figure 17:
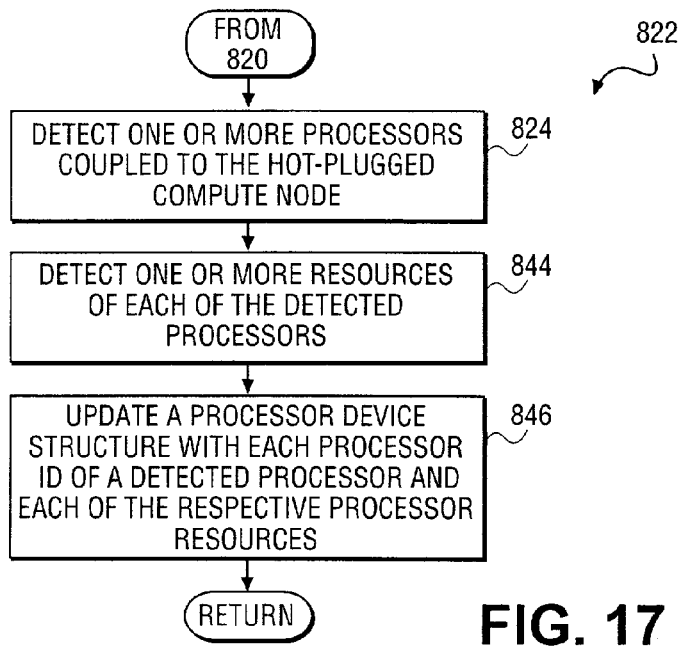
FIG. 17 depicts a flowchart illustrating an additional method for enumeration of processor resources in accordance with the further embodiment of the present invention.

Referring now to FIG. 17, FIG. 17 depicts an additional method 822 for performing device, as well as resource information, of process block 820 as depicted in FIG. 15. At process block 824, detection of one or more processors coupled to the hot-plugged compute node is performed. Once performed, one or more resources of each of the detected processors are also detected. At process block 840, a processor device structure is updated with each processor ID of each detected processor and each of the respective processor resources. Accordingly, as described above, updating of the processor device structure will provide device enumeration, as well as resource enumeration, to the running operating system once the running operating system queries the device structure. As such, using this information, the running operating system will be able to issue tasks to the processors of the hot-plugged compute node.

Figure 18:
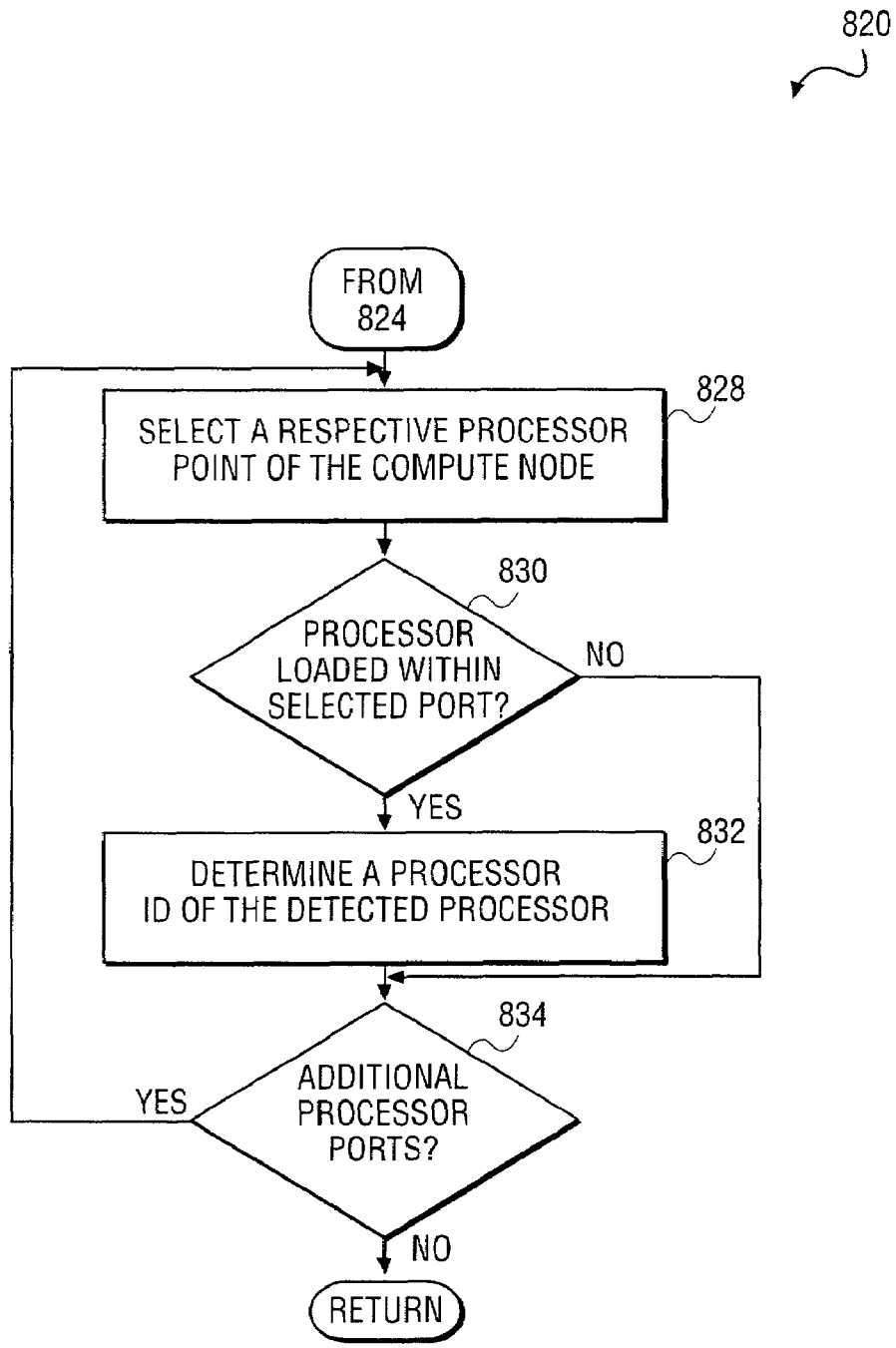
FIG. 18 depicts a flowchart illustrating an additional method for detecting one or more processors following compute node hot-plug in accordance with a further embodiment of the present invention.

Referring now to FIG. 18, FIG. 18 depicts a flowchart illustrating an additional method for detecting the one or more processors of process block 824. At process block 828, a respective processor port of the compute node is selected according to, for example the CPUKILL bits, of the system reset register. Once selected, at process block 830, it is determined whether a processor is loaded within the processor port of the compute node. As described above, this process is performed by conventional techniques as known in the art. Next, at process block 832, an ID of the detected processor is determined. Finally, at process block 834, process blocks 828-832 are repeated for each of the processor ports of the hot-plugged compute node in order to detect each processor coupled to the hot-plugged compute node.

Figure 19:
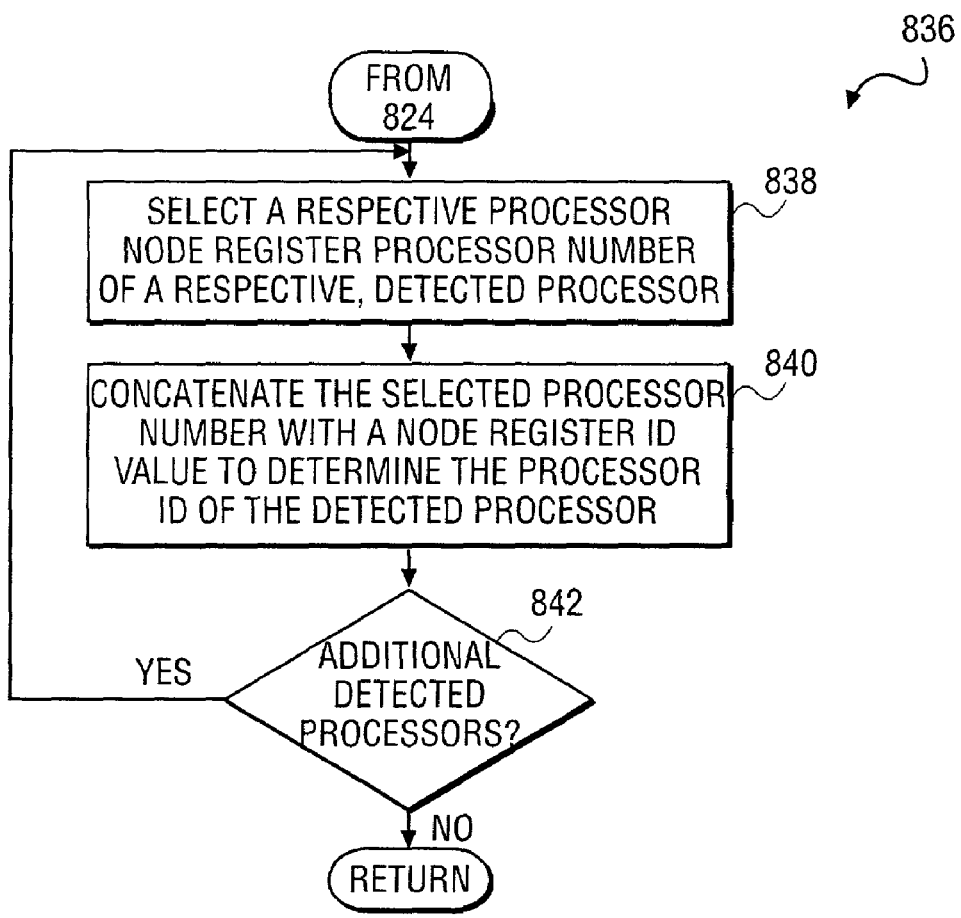
FIG. 19 depicts a flowchart illustrating an additional method for determining a processor ID of each of one or more detected processors in accordance with an exemplary embodiment of the present invention.

Referring now to FIG. 19, FIG. 19 depicts a flowchart illustrating an additional method 836 for detecting a processor ID of the one or more detected processors, for example of process block 824 as depicted in FIG. 17. At process block 838, selection from a respective processor node register, of a processor number is performed for a respective detected processor. Next, at process block 840, the selected processor number is concatenated with a node ID of the compute node in order to determine an ID of the processor. Finally, at process block 842, process blocks 838 through 840 are repeated for each of the one or more detected processors of the hot-plugged compute node to determine a processor ID for each of the detected processors.

Accordingly, the present invention describes techniques for enumeration of processors coupled to a hot-plugged compute node. In addition, a unique ID is set as a processor ID of each detected processor. This mechanism for setting the processor ID of each detected processor enables device enumeration to an enumeration procedure which is provided by an ACPI subsystem. Accordingly, the enumeration procedure will determine each detected processor and the detected processor's ID via various configuration registers contained within the compute node.

Once determined, the enumeration procedure will update a device structure in order to provide device enumeration and resource enumeration of the processors of the hot-plug compute node to the running operating system. By providing this information, the running operating system may begin running the processors and utilizing the processors in order to assign tasks thereto. As such, the techniques described herein avoid implementing of a new PCI definition for supporting hot-plug of processor-memory nodes.

ALTERNATE EMBODIMENTS

Several aspects of one implementation of a system architecture for providing enabling hot-plug of a compute node have been described. However, various implementations of the system architecture provide numerous features including, complementing, supplementing, and/or replacing the features described above. Features can be implemented as part of the system microcode, software procedures or as part of the compute node in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a method and apparatus for processor enumeration of a hot-plugged compute node, it will be appreciated by those skilled in the art that the teaching of the present invention can be applied to other systems. In fact, systems for hot-plug (all non-PCI devices) are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. Accordingly, the present invention describes techniques for enumeration of processors coupled to a hot-plugged compute node. In addition, a unique ID is set as a processor ID of each detected processor. This mechanism for setting the processor ID of each detected processor enables device enumeration to an enumeration procedure which is provided by an ACPI subsystem. Accordingly, the enumeration procedure will determine each detected processor and the detected processor's ID via various configuration registers contained within the compute node.

Once determined, the enumeration procedure will update a device structure in order to provide device enumeration and resource enumeration of the processors of the hot-plug compute node to the running operating system. By providing this information, the running operating system may begin running the processors and utilizing the processors in order to assign tasks thereto. As such, the techniques described herein avoid implementing of a new PCI definition for supporting hot-plug of processor-memory nodes.

Having disclosed exemplary embodiments and the best mode, modifications and variations may be made to the disclosed embodiments while remaining within the scope of the invention as defined by the following claims.

What is claimed is:

1. A method, comprising:
    detecting, by a compute node in response to a hot-plug reset instruction, one or more processors of the compute node;
    generating, by the compute node, a unique ID value for each detected processor to assign a unique ID value to each respective processor of the compute node to enable enumeration of the detected processors of the compute node to an operating system of a system architecture in which the compute node is hot plugged;
    issuing, by the compute node, hot plug notification to the operating system; and
    starting, in response to an operating system activation request, the one or more processors of the compute node.

2. The method of claim 1, wherein detecting further comprises:
    setting a respective processor ID of each of the one or more detected processors, coupled to the compute node, to a respective unique ID value; and
    initiating a handshake with the operating system, to thereby provide hot-plug notification to the operating system.

3. The method of claim 2, wherein setting of the processor ID further comprises:
    selecting, from a respective processor node register, a corresponding processor number for a respective detected processor;
    concatenating the selected processor number with a node register to form a unique ID;
    replacing a processor ID of the respective processor with the unique ID; and
    repeating the selecting and concatenating for each of the one or more detected processors.

4. The method of claim 2, wherein setting the respective processor ID further comprises:
    selecting a processor from the one or more detected processors;
    generating, for the selected processor, the unique ID value according to a processor number of the selected processor and a node ID of the compute node;
    updating a processor ID within the selected processor according to the generated, unique ID; and
    repeating the selecting, generating and updating for each of the one or more detected processors.

5. The method of claim 4, wherein selecting a processor further comprises:
    querying a node processor register to determine a processor capacity value of the compute node;
    selecting a respective processor port of the compute node;
    determining when a processor is loaded within the processor port of the compute node;
    when a processor is detected, setting a corresponding processor node register value to indicate presence of the detected processor; and
    repeating the selecting, determining and setting for each of the one or more detected processors according to the processor capacity value, such that each processor ID is set according to a respective processor node register value.

6. The method of claim 2, wherein initiating the handshake further comprises:
    enabling a node link of the compute node, such that communication with a system architecture port is activated; and
    directing the compute node to issue, via the link, a system interrupt.

7. The method of claim 6, further comprising:
    initiating, by the operating system, a platform subsystem in response to the system interrupt;
    providing hot-plug event notification to the platform subsystem; and
    running, by the platform subsystem, a resource enumeration procedure to enumerate resources of the one or more detected processors.

8. The method of claim 6, wherein enabling the node link further comprises:
    setting a node port register to direct the compute node to enable the node link;
    issuing a request to the compute node to issue a system control interrupt; and
    initiating, by the operating system, a platform subsystem in response to the system control interrupt.

9. The method of claim 1, further comprising:
    detecting one or more processors coupled to the compute node; and
    setting a respective node processor register for each detected processor to enable enumeration of each detected processor to the operating system.

10. A method, comprising:
    detecting, by an operating system of a system architecture in which a compute node is hot plugged, an interrupt issued by the hot plugged compute node as a hot-plug notification;
    initiating, in response to the hot-plug notification, an enumeration procedure;
    detecting at least one processor coupled to the compute node if the processor is assigned a unique ID value that is generated by the compute node;
    enumerating, by the enumeration procedure, resources of the at least one detected processor of the hot plugged compute node to the operating system of the system architecture in which the compute node is hot plugged; and
    transmitting, by the operating system, an activation request to the at least one detected processor of the hot plugged compute node.

11. The method of claim 10, wherein initiating further comprises:
    initiating, in response to the interrupt, a system control interrupt to thereby direct the operating system to launch a platform subsystem; and
    once the platform subsystem is launched, issuing resource enumeration event notification to the platform subsystem.

12. The method of claim 10, wherein enumerating further comprises:
    launching, in response to resource event notification, the enumeration procedure;

detecting, in response to processor enumeration, one or more processors coupled to the hot plugged compute node;

detecting, in response to processor enumeration, one or more resources required by the one or more detected processors; and updating a processor device structure with each detected processor ID and resource, thereby enumerating the one or more detected processors and the resources of the one or more detected processors to the operating system.

13. The method of claim 12, wherein detecting further comprises:

selecting a corresponding processor node register value of the compute node;

when a processor node register value is set, detecting a processor; and repeating the selecting and detecting for each processor node register value of the compute node to detect the one or more processors.

14. The method of claim 12, wherein detecting further comprises:

selecting, from a respective processor node register, a corresponding processor number for a respective detected processor;

concatenating the selected processor number with a node register ID value to determine a processor ID for the respective processor;

replacing a processor ID of the respective processor with the unique ID; and repeating the selecting and concatenating for each of the one or more detected processors to determine a processor ID for each of the one or more detected processors.

15. A computer-readable storage medium including instructions that, if executed by a machine, will cause the machine to perform a method, comprising:

detecting, by a compute node in response to a hot-plug reset instruction, one or more processors of the compute node;

generating, by the compute node, a unique ID value for each detected processor to assign a unique ID value to each respective processor of the compute node to enable enumeration of the detected processors of the compute node to an operating system of a system architecture in which the compute node is hot plugged;

issuing, by the compute node, hot-plug notification to the operation system; and starting, in response to an operating system activation request, the one or more processors of the compute node.

16. The computer-readable storage medium as claimed in claim 15, wherein detecting one or more processors causes the machine to perform a method, comprising:

setting a respective processor ID of each of the one or more detected processors, coupled to the compute node, to a respective unique ID value; and initiating a handshake with the operating system, to thereby provide hot-plug notification to the operating system.

17. The computer-readable storage medium as claimed in claim 16, wherein setting the processor ID causes the machine to perform a method, comprising:

selecting, from a respective processor node register, a corresponding processor number for a respective detected processor;

concatenating the selected value with a node register ID value to form the unique processor ID;

replacing a processor ID of the respective detected processor with the unique ID; and repeating the selecting and concatenating for each of the one or more detected processors.

18. The computer-readable storage medium as claimed in claim 16, wherein setting the respective processor ID causes the machine to perform a method, comprising:

selecting a processor from the one or more detected processors;

generating, for the selected processor, the unique ID value according to a processor number of the selected processor and a node ID of the compute node;

updating a processor ID within the selected memory processor according to the generated, unique ID; and repeating the selecting, generating and updating for each of the one or more detected processors.

19. The computer-readable storage medium as claimed in claim 18, wherein selecting a processor causes the machine to perform a method, comprising:

querying a node processor register to determine a processor capacity value of the compute node;

selecting a respective node port of the compute node;

determining when a processor is loaded within the processor port of the compute node;

when a processor is detected, setting a corresponding processor node register value to indicate presence of the detected processor; and repeating the selecting, determining and setting for each of the one or more detected processors, according to the processor capacity value, such that each processor TD is set according to the respective processor node register value.

20. The computer-readable storage medium as claimed in claim 16, wherein initiating the handshake causes the machine to perform a method, comprising:

enabling a node link of the compute node, such that communication with a system architecture port is activated; and directing the compute node to issue, via the link, to a system interrupt.

21. The computer-readable storage medium as claimed in claim 20, wherein the machine performs a further method, comprising:

initiating, by the operating system, a platform subsystem in response to the system interrupt;

providing hot-plug event notification to the platform subsystem; and running, by the platform subsystem, a resource enumeration procedure to enumerate resources of the one or more detected processors.

22. The computer-read able storage medium as claimed in claim 20, wherein enabling the node link causes the machine to perform a method, comprising:

setting a node port register to direct the compute node to enable the node link;

issuing a request to the compute node to issue a system control interrupt; and initiating, by the operating system, a platform subsystem in response to the system control interrupt.

23. The computer-readable storage medium as claimed in claim 15, wherein the machine performs a further method, comprising:

detecting one or more processors coupled to the compute node; and setting a respective node processor register for each detected processor to enable enumeration of each detected processor to the operating system.

24. A computer-readable storage medium that provides instructions that, if executed by a machine, will cause the machine to perform a method, comprising:
- detecting, by an operating system of a system architecture in which a compute node is hot plugged, an interrupt issued by the hot plugged compute node as a hot-plug notification;
- initiating, in response to the hot-plug notification, an enumeration procedure;
- detecting at least one processor coupled to the compute node if the processor is assigned a unique ID value that is generated by the compute node;
- enumerating, by the enumeration procedure, resources of the at least one detected processor of the hot plugged compute node to the operating system of the system architecture in which the compute node is hot plugged; and
- transmitting an activation request to the at least one processor of the hot plugged compute node.

25. The computer-readable storage medium as claimed in claim 24, wherein initiating an enumeration procedure causes the machine to perform a further method, comprising:
- initiating, in response to the interrupt, a system control interrupt to thereby direct the operating system to launch a platform subsystem; and
- issuing resource enumeration event notification to the platform subsystem.

26. The computer-readable storage medium as claimed in claim 24, wherein enumerating resources causes the machine to perform a further method, comprising:
- launching, in response to the resource event notification, the enumeration procedure;
- detecting, in response to processor enumeration, the at least one processor coupled to the hot plugged compute node;
- detecting, in response to processor enumeration, one or more resources required by the detected processor; and
- updating a processor device structure with each detected processor ID and resource, thereby enumerating the at least one detected processor and the resources of the at least one detected processor to the operating system.

27. The computer-readable storage medium as claimed in claim 26, wherein detecting one or more processors causes the machine to perform a further method, comprising:
- selecting a corresponding processor node register value of the compute node;
- when a processor node register value is set, detecting a processor; and
- repeating the selecting and detecting for each processor node register value of the compute node to detect the one or more processors.

28. The computer-readable storage medium as claimed in claim 26 wherein detecting one or more processors causes the machine to perform a further method, comprising:
- selecting, from a respective processor node register, a corresponding processor number for a respective detected processor;
- concatenating the selected processor number with a node register ID value to determine a processor ID for the respective processor;
- replacing a processor ID of the respective processor with the unique ID; and
- repeating the selecting and concatenating for each of the one or more detected processors to determine a processor ID for each of the one or more detected processors.

29. A method comprising:
- activating a system BIOS of a compute node including at least one processor in response to a hot-plug reset instruction;
- generating, by the system BIOS, a respective processor ID for each detected processor to assign a unique ID value to each respective processor of the compute node to a respective unique value to enable enumeration of the detected processors of the compute node to an operating system of a system architecture in which the compute node is hot plugged;
- initiating, by the system BIOS, a handshake with an operating system of a system architecture in which the compute node is hot plugged to provide hot-plug notification to the operating system; and
- staffing, in response to an operating system activation request, the at least one processor of the compute node.

* * * * *